(12) United States Patent
Kobayashi et al.

(10) Patent No.: US 10,773,664 B2
(45) Date of Patent: Sep. 15, 2020

(54) BRACKET-EQUIPPED CONDUCTIVE PATH

(71) Applicant: Sumitomo Wiring Systems, Ltd., Yokkaichi, Mie (JP)

(72) Inventors: Toshinari Kobayashi, Mie (JP); Kyungwoo Kim, Mie (JP); Moriyuki Shimizu, Mie (JP); Hironobu Yamamoto, Mie (JP)

(73) Assignee: Sumitomo Wiring Systems, Ltd., Yokkaichi-shi, Mie (JP)

( * ) Notice: Subject to any disclaimer, the term of this patent is extended or adjusted under 35 U.S.C. 154(b) by 0 days.

(21) Appl. No.: 16/735,853

(22) Filed: Jan. 7, 2020

(65) Prior Publication Data

US 2020/0223381 A1    Jul. 16, 2020

(30) Foreign Application Priority Data

Jan. 16, 2019  (JP) .................................. 2019-00486

(51) Int. Cl.
*B60R 16/02* (2006.01)
*H01B 13/012* (2006.01)

(52) U.S. Cl.
CPC ... *B60R 16/0215* (2013.01); *H01B 13/01209* (2013.01)

(58) Field of Classification Search
CPC .................................................. B60R 16/0215
USPC ........................................................ 174/72 A
See application file for complete search history.

(56) References Cited

U.S. PATENT DOCUMENTS

| | | | |
|---|---|---|---|
| 2002/0019165 A1 | 2/2002 | Aoki et al. | |
| 2012/0222296 A1* | 9/2012 | Miyamoto | E05F 15/443 29/825 |
| 2015/0107894 A1* | 4/2015 | Hayashi | B60R 16/0222 174/72 A |
| 2017/0313265 A1* | 11/2017 | Shimizu | B60R 16/023 |
| 2018/0072248 A1* | 3/2018 | Ohashi | B60R 16/0215 |

* cited by examiner

*Primary Examiner* — Sherman Ng
(74) *Attorney, Agent, or Firm* — Honigman LLP

(57) ABSTRACT

A bracket-equipped conductive path A, comprising: a conductive path main body; a protector that is tubular, is made of a synthetic resin, and surrounds the conductive path main body; a bracket that is made of a metal, includes a plate-shaped base portion, and is formed as a single body with the protector in a state in which at least a portion of the base portion is embedded in the protector; and a displacement restricting portion that the bracket is provided with, and that restricts displacement of the conductive path main body by abutting the conductive path main body.

9 Claims, 2 Drawing Sheets

BRACKET-EQUIPPED CONDUCTIVE PATH

CROSS-REFERENCE TO RELATED APPLICATIONS

This application claims priority of Japanese Patent Application No. JP 2019-004862 filed on Jan. 16, 2019, the contents of which are incorporated herein.

TECHNICAL FIELD

The present disclosure relates to a bracket-equipped conductive path.

BACKGROUND

A plurality of electrical devices are arranged at a plurality of locations in automobiles, and a plurality of electrical wires that are connected to the plurality of electrical devices are bundled together midway on a wiring route, thus constituting a wire harnesses. JP 2002-058151A discloses an example of a wire harness in which such a plurality of electrical wires branch off midway and are routed as described above. Metal brackets can be used as a means for attaching such wire harnesses to the bodies of vehicles. In this case, the wire harness can be correctly routed along an intended route by attaching brackets to parts of the wire harness where the electrical wires branch off and parts of the wire harness where electrical wires bend.

JP 2002-058151A is an example of related art.

As a means of fixing a metal bracket to a wire harness, a method is conceivable in which the wire harness is surrounded by a tubular synthetic resin protector, with a plate-shaped base portion that the bracket is provided with being embedded in the protector. However, with such a configuration, if the wire harness is subjected to continuous vibration outside of the protector, there is concern that the protector will repeatedly deform due to the vibration of the wire harness, and therefore cracks may form in the protector and the bracket may become separated from the protector.

The present disclosure was completed based on the above circumstances, and an object thereof is to prevent protectors and brackets from separating from each other.

SUMMARY

The present disclosure includes a conductive path main body, a protector that is tubular, is made of a synthetic resin, and surrounds the conductive path main body. A bracket that is made of a metal, includes a plate-shaped base portion, and is formed as a single body with the protector in a state in which at least a portion of the base portion is embedded in the protector. A displacement restricting portion that the bracket is provided with restricts displacement of the conductive path main body by abutting the conductive path main body.

Advantageous Effects of the Disclosure

Even if the conductive path main body vibrates outside of the protector, relative displacement of the conductive path main body with respect to the bracket is restricted by a displacement restricting portion, thus suppressing the transmission of vibration from the conductive path main body to the protector. This suppresses deformation of the protector and it is therefore possible to prevent the bracket separating from the protector due to the repeated deformation of the protector.

EMBODIMENTS OF THE DISCLOSURE

The present disclosure, wherein the displacement restricting portion may also be embedded in the protector. With this configuration, it is possible to effectively suppress deformation of the protector.

The present disclosure, wherein the displacement restricting portion may also include a plurality of abutment portions that stand upright from the base portion and sandwich the conductive path main body in the radial direction thereof. With this configuration, the plurality of abutting portions makes it possible to effectively suppress vibration of the conductive path main body.

The present disclosure, wherein the plurality of abutment portions may also be arranged in a staggered manner and stand upright from portions of the base portion that are different from each other relative to the axial direction of the conductive path main body. With this configuration, it is possible to restrict displacement of the conductive path main body across a long range while making the bracket lighter.

The present disclosure, wherein the region of the bracket that is embedded in the protector may also be formed with a protruding or recessed anchor portion. With this configuration, it is possible to suppress deformation of the protector by locking a portion of the protector to the anchor portion.

First Embodiment

Figure 1:
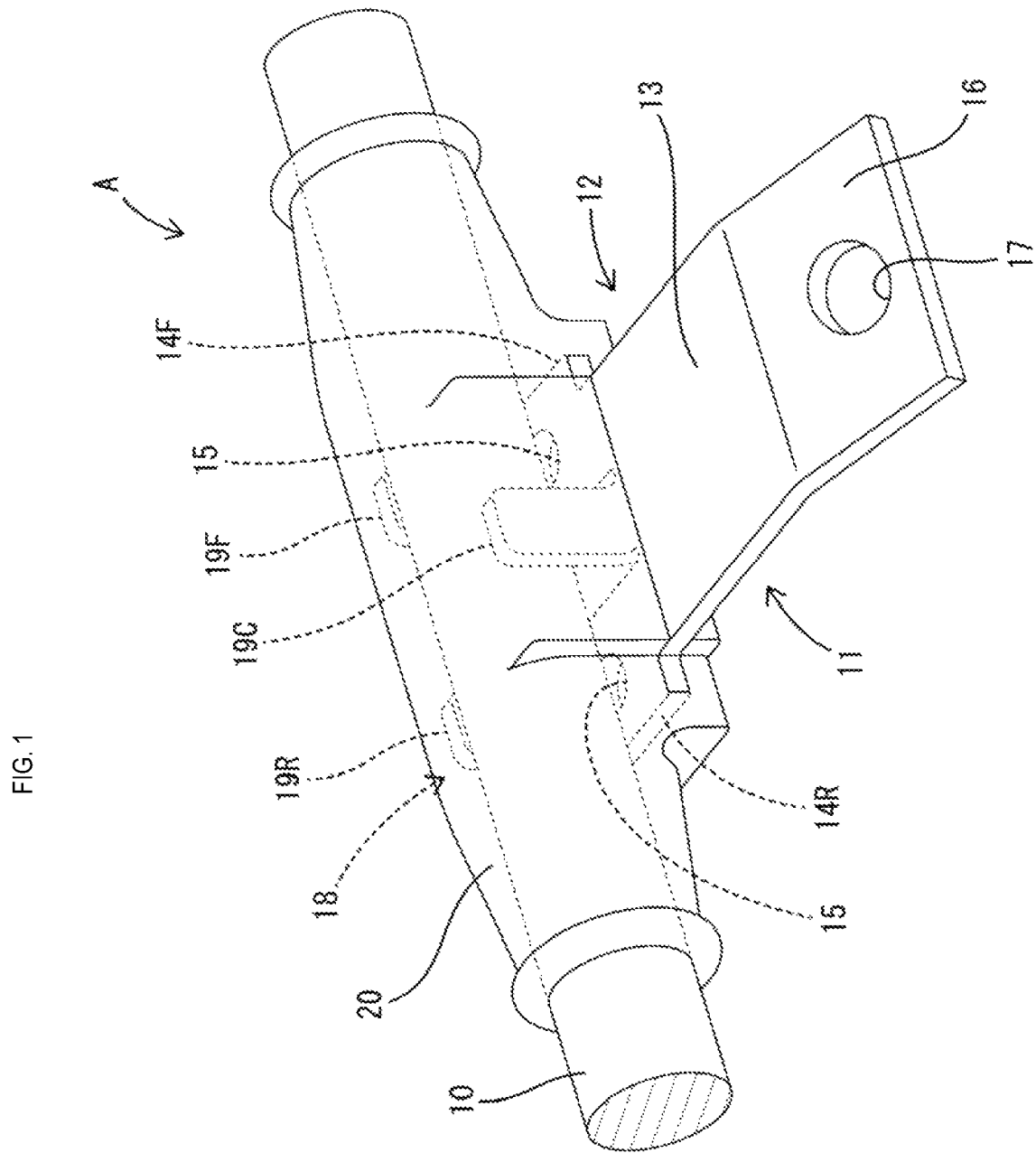
FIG. 1 is a perspective view of a bracket-equipped conductive path of a first embodiment.
Figure 2:
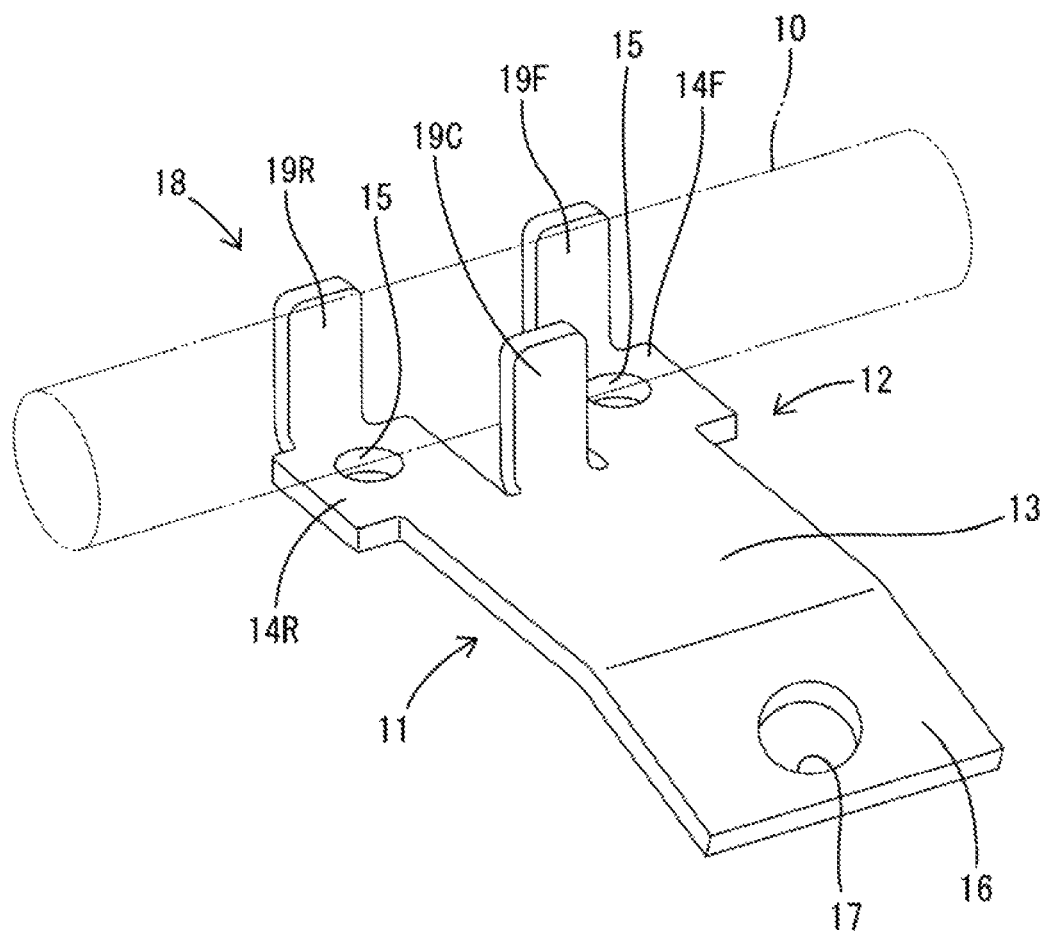
FIG. 2 is a perspective view showing a state in which the bracket and the conductive path main body are attached to each other.

The following describes a first embodiment of the present disclosure with reference to FIGS. 1 and 2. Note that in the following description, the up-down direction is defined as the up-down direction of the orientation in FIGS. 1 and 2. In regards to the front-rear direction, the diagonally upper-rightward direction in FIGS. 1 and 2 is defined as the forward direction. In regards to the left-right direction, the diagonally lower-rightward direction in FIGS. 1 and 2 is defined as the rightward direction. A bracket-equipped conductive path A of the first embodiment includes a conductive path main body 10, a bracket 11, and a protector 20. The bracket-equipped conductive path A is fixed and attached to a vehicle body (not shown).

The conductive path main body 10 may also be a wire harness that bundles together a plurality of covered wires (not shown) for example. When the bracket-equipped conductive path A is attached to a vehicle body, the axis of the region in which the conductive path main body 10 is formed as a single body with the bracket 11 and the protector 20 runs in the front-rear direction. The cross-sectional shape of the conductive path main body 10 is circular when cut perpendicular to the axis.

The bracket 11 is formed in a predetermined shape through processing such as bending a metal plate of a predetermined shape. The bracket 11 is a single member that includes a level (horizontal) plate-shaped base portion 12, a rectangular plate-shaped attachment portion 16 that is continuous with the base portion 12, and a displacement restricting portion 18 that protrudes upward from the base portion 12. The base portion 12 is constituted by one exposed portion 13, and a pair of front and rear embedded portions 14F and 14R.

The exposed portion 13 has a substantially square shape in a plan view thereof. The pair of front and rear embedded portions 14F and 14R are flush with the exposed portion 13 from the left edge of the exposed portion 13, and extend in a cantilever manner towards the left. The pair of front and rear embedded portions 14F and 14R are arranged with a gap therebetween in the front-rear direction. Both the front and rear embedded portions 14F and 14R have anchor portions 15 formed therein that pass through the embedded portions 14F and 14R in the plate-thickness direction (the up-down direction).

The attachment portion 16 extends slantly downward at an obtuse angle from the right hand side edge of the base portion 12 (the opposite side to the embedded portions 14F and 14R side of the exposed portion 13). The attachment portion 16 has an attachment hole 17 formed therein. The bracket-equipped conductive path A is fixed to the vehicle body by fastening it with a bolt (not shown) that is inserted into the attachment hole 17, and a nut (not shown).

The displacement restricting portion 18 is constituted by first to third abutment portions 19F, 19C and 19R (referred to as "abutment portion" in the claims). The first abutment portion 19F stands substantially perpendicularly upright from the edge of the extending end of the front side of the embedded portion 14F. The second abutment portion 19C stands substantially perpendicularly upright from the left hand side edge of the exposed portion 13 in the region between the front and rear embedded portions 14F and 14R. The third abutment portion 19R stands substantially perpendicularly upright from the edge of the extending end of the rear side of the embedded portion 14R.

In a side view of the bracket 11, the first abutment portion 19F, the second abutment portion 19C, and the third abutment portion 19R are arranged next to each other in that order in the axis direction of the conductive path main body 10 (the front-rear direction). In a rear view of the bracket 11, the first abutment portion 19F and the third abutment portion 19R are arranged overlapping each other, and the second abutment portion 19C is arranged at a position that is rightward of the first abutment portion 19F and the third abutment portion 19R.

In a plan view of the bracket 11, the first abutment portion 19F, the second abutment portion 19C, and the third abutment portion 19R are arranged in a staggered manner. The distance in the left-right direction between the first abutment portion 19F and the second abutment portion 19C, and between the third abutment portion 19R and the second abutment portion 19C, is the same as, or slightly smaller than, the outer diameter of the conductive path main body 10.

The protector 20 is made from a synthetic resin, and is cylindrical overall and coaxial to the conductive path main body 10. The protector 20 is formed as a single body with the conductive path main body 10 and the bracket 11 through insert molding or mold formation. In a state in which the protector 20, the conductive path main body 10, and the bracket 11 are formed as a single body, the whole embedded portions 14F and 14R and the whole displacement restricting portion 18 of the bracket 11 are embedded in the protector 20, and the exposed portion 13 (a portion of the base portion 12) and the attachment portion 16 of the bracket 11 are exposed to the outside of protector 20.

When the bracket-equipped conductive path A is manufactured, firstly, the conductive path main body 10 and the bracket 11 are temporarily assembled by fitting the conductive path main body 10 into the displacement restricting portion 18 of the bracket 11. In this temporarily assembled state, the first to third abutment portions 19F, 19C, and 19R, which are arranged in a staggered manner, are externally fitted to the conductive path main body 10, and in a front view parallel to the axial line of the conductive path main body 10, the conductive path main body 10 is held in the left-right direction between the first abutment portion 19F and the second abutment portion 19C, and between the third abutment portion 19R and the second abutment portion 19C.

At this time, the first to third abutment portions 19F, 19C, and 19R directly abut the outer surface of the conductive path main body 10. Also, the lower end portion of the conductive path main body 10 directly abuts against the base portion 12 (the upper surface of the embedded portions 14F and 14R). The temporarily assembled conductive path main body 10 and bracket 11 are set in a mold (not shown) and are formed as a single body with the protector 20 through insert molding or mold forming. The manufacture of the bracket-equipped conductive path A is complete once the protector 20 solidifies.

Vibration from the body of a moving vehicle is transmitted to the bracket-equipped conductive path A, and through this transmission of vibration, the regions of the conductive path main body 10 that are exposed outside of the protector 20 shake in the left-right direction. When the conductive path main body 10 shakes in the left-right direction, the protector 20 and the conductive path main body 10, which are formed as a single body, elastically deform in the left-right direction and therefore cracking, plastic deformation, or the like may occur in the protector 20, and thus there is concern that the protector 20 and the bracket 11 that are formed as a single body in a state of surface-contact may separate from each other at the surface-border between the bracket 11 and the protector 20.

However, inside the protector 20, the conductive path main body 10 is sandwiched from the left and the right by the first to third abutment portions 19F, 19C, and 19R of the displacement restricting portion 18, and the directions from which the first to third abutment portions 19F, 19C, and 19R are sandwiched are the same directions as the directions in which the conductive path main body 10 shakes outside of the protector 20. Accordingly, the region of the conductive path main body 10 that is embedded in the protector 20 abutting the displacement restricting portion 18 is not subjected to relative displacement in the left-right direction with respect to the bracket 11. Thus, the part of the protector 20 that abuts the displacement restricting portion 18 is not elastically deformed to the left and right, and therefore there is no risk of the protector 20 and the bracket 11 separating from each other.

Also, a portion of the protector 20 is inserted by way of insert molding or mold forming into the anchor portions 15 formed in the bracket 11, and therefore relative displacement of the protector 20 and the bracket 11 is restricted due to the anchoring effect. In particular, the anchor portions 15 pass through the base portion 12 (the bracket 11), and the direction in which the anchor portions 15 pass therethrough is a direction orthogonal to the direction in which the conductive path main body 10 shakes (the vibration direction) outside of the protector 20. Accordingly, relative displacement of the protector 20 and the bracket 11 due to the shaking (vibration) of the conductive path main body 10 is effectively suppressed.

The bracket-equipped conductive path A of the first embodiment as described above includes the conductive path main body 10, the tubular protector 20 that is made from a synthetic resin and surrounds the conductive path main body 10, and the bracket 11 that is made of a metal. The bracket 11 includes the plate-shaped base portion 12, and is formed as a single body with the protector 20 when at least a portion (the embedded portions 14F and 14R) of the base portion 12 are embedded inside of the protector 20. The displacement restricting portion 18 is formed on the bracket 11 and restricts displacement of the conductive path main body 10 by abutting the conductive path main body 10.

Even if the conductive path main body 10 vibrates outside of the protector 20, relative displacement of the conductive path main body 10 with respect to the bracket 11 is restricted by the displacement restricting portion 18, thus suppressing the transmission of vibration from the conductive path main body 10 to the protector 20. This suppresses deformation of the protector 20 and it is therefore possible to prevent the bracket 11 separating from the protector 20 due to the repeated deformation of the protector 20.

Also, if the displacement restricting portion 18 is provided outside of the protector 20, depending on the configuration of the displacement restricting portion 18, there is concern that the vibration of the conductive path main body 10 will be transmitted to the protector 20. However, in the first embodiment, the whole displacement restricting portion 18 is embedded in the protector 20, and therefore it is possible to effectively prevent the conductive path main body 10 from shaking inside the protector 20. Thus, deformation of the protector 20 can be effectively suppressed, and it is possible to reliably prevent the protector 20 and the bracket 11 from separating from each other.

Also, the displacement restricting portion 18 is constituted by three (a plurality of) abutment portions 19F, 19C, and 19R that stand upright from the base portion 12. These three abutment portions 19F, 19C, and 19R sandwich the conductive path main body 10 in the radial direction thereof (from the left and right), and therefore it is possible to effectively suppress the occurrence of the conductive path main body 10 vibrating inside the protector 20. Also, the three abutment portions 19F, 19C, and 19R stand upright from parts of the base portion 12 that are different to each other relative to the axial direction of the conductive path main body 10, and are arranged in a staggered manner. With this configuration, it is possible to restrict displacement of the conductive path main body 10 across a long range in the axial direction thereof while making the bracket 11 lighter.

Also, in the region of the bracket 11 that is embedded in the protector 20, the surface of the bracket 11 is recessed, and furthermore the anchor portions 15 are formed passing through to the under side of the bracket 11. With this configuration, it is possible to suppress deformation of the protector 20 by locking portions of the protector 20 to the anchor portions 15.

Other Embodiments

The present disclosure is not limited to the embodiments described above with reference to the drawings, and, for example, the following embodiments also fall within the technical scope of the present disclosure.

In the first embodiment described above, the whole displacement restricting portion is embedded inside the protector, but a portion of the displacement restricting portion or the whole displacement restricting portion may also be exposed outside of the protector.

In the first embodiment described above, a portion of the base portion is embedded in the protector, but the whole base portion may also be embedded in the protector.

In the first embodiment described above, the plurality of abutment portions are arranged in a staggered manner such that the positions thereof are different to each other relative to the axial direction of the conductive path main body, but the plurality of abutment portions may also be arranged at the same position relative to the axial direction of the conductive path main body.

In the first embodiment described above, the displacement restricting portion is constituted by three abutment portions, but the number of abutment portions that constitute the displacement restricting portion may also be two, or may be four or more.

In the first embodiment described above, the anchor portions have a recessed shape of a through-hole, but the anchor portions may also be recessed in a configuration not penetrating the surface of the bracket, or may also protrude in a protruding shape from the surface of the bracket.

In the first embodiment described above, the anchor portions are only formed in the base portion, but the anchor portions may also be formed in both the base portion and the displacement restricting portion, and may also be formed only in the displacement restricting portion.

In the first embodiment described above, the bracket has anchor portions formed therein, but a configuration is also possible in which the bracket does not include the anchor portions.

What is claimed is:

1. A bracket-equipped conductive path, comprising:
    a conductive path main body;
    a protector that is tubular, is made of a synthetic resin, and surrounds the conductive path main body;
    a bracket that is made of a metal, includes a plate-shaped base portion, and is formed as a single body with the protector in a state in which at least a portion of the base portion is embedded in the protector; and
    a displacement restricting portion that the bracket is provided with, and that restricts displacement of the conductive path main body by abutting the conductive path main body.

2. The bracket-equipped conductive path according to claim 1, wherein
    the displacement restricting portion is embedded in the protector.

3. The bracket-equipped conductive path according to claim 1, wherein the displacement restricting portion includes a plurality of abutment portions that stand upright from the base portion and sandwich the conductive path main body in the radial direction thereof.

4. The bracket-equipped conductive path according to claim 3, wherein the plurality of abutment portions are arranged in a staggered manner and stand upright from portions of the base portion that are different from each other relative to the axial direction of the conductive path main body.

5. The bracket-equipped conductive path according to claim 1, wherein the region of the bracket that is embedded in the protector is formed with a protruding or recessed anchor portion.

6. The bracket-equipped conductive path according to claim 2, wherein the displacement restricting portion includes a plurality of abutment portions that stand upright from the base portion and sandwich the conductive path main body in the radial direction thereof.

7. The bracket-equipped conductive path according to claim 2, wherein the region of the bracket that is embedded in the protector is formed with a protruding or recessed anchor portion.

8. The bracket-equipped conductive path according to claim 3, wherein the region of the bracket that is embedded in the protector is formed with a protruding or recessed anchor portion.

9. The bracket-equipped conductive path according to claim 4, wherein the region of the bracket that is embedded in the protector is formed with a protruding or recessed anchor portion.

\* \* \* \* \*